United States Patent
Tamiya

(10) Patent No.: US 9,612,104 B2
(45) Date of Patent: Apr. 4, 2017

(54) DISPLACEMENT DETECTING DEVICE

(71) Applicant: DMG MORI SEIKI CO., LTD., Yamato-Koriyama, Nara (JP)

(72) Inventor: Hideaki Tamiya, Isehara (JP)

(73) Assignee: DMG MORI SEIKI CO., LTD., Yamato-Koriyama (JP)

( * ) Notice: Subject to any disclaimer, the term of this patent is extended or adjusted under 35 U.S.C. 154(b) by 57 days.

(21) Appl. No.: 14/686,392

(22) Filed: Apr. 14, 2015

(65) Prior Publication Data

US 2015/0292870 A1 Oct. 15, 2015

(30) Foreign Application Priority Data

Apr. 14, 2014 (JP) ................................. 2014-082475
Nov. 27, 2014 (JP) ................................. 2014-240549

(51) Int. Cl.
*G01B 11/14* (2006.01)
*G01B 9/02* (2006.01)
(Continued)

(52) U.S. Cl.
CPC ..... *G01B 9/02022* (2013.01); *G01B 9/02081* (2013.01); *G01D 5/34746* (2013.01); *G01D 5/38* (2013.01); *G01B 2290/70* (2013.01)

(58) Field of Classification Search
CPC ............ G01B 9/02022; G01B 9/02081; G01B 2290/70; G01D 5/34746; G01D 5/38
See application file for complete search history.

(56) References Cited

U.S. PATENT DOCUMENTS 3,809,481 A * 5/1974 Schindler .............. G01J 3/4535
356/452
4,278,351 A * 7/1981 Breckinridge .......... G01J 3/453
356/455

(Continued)

FOREIGN PATENT DOCUMENTS

| EP | 2 587 212 A2 | 5/2013 |
| JP | H05089480 | 4/1993 |
| JP | 2013-195205 A | 9/2013 |

OTHER PUBLICATIONS

Sep. 22, 2015 Extended Search Report issued in European Patent Application No. 15163498.7.

*Primary Examiner* — Tarifur Chowdhury
*Assistant Examiner* — Mohamed K Amara
(74) *Attorney, Agent, or Firm* — Oliff PLC

(57) ABSTRACT

A displacement detecting device includes a light source that performs irradiation with light, a light-beam splitting section, a reflection/transmission section, a phase plate, a transmission-type diffraction grating, a light-beam combining section, a light-receiving section, and a relative position information output unit. The reflection/transmission section transmits or reflects a first light beam, and causes the beam to enter a member to be measured. Furthermore, the reflection/transmission section guides the first light beam to a specific position of the member to be measured in the case where the member to be measured is in a reference position. Moreover, an optical path of the first light beam reflected by the member to be measured again overlaps with an optical path of the first light beam reflected at a specific position of the member to be measured.

5 Claims, 6 Drawing Sheets

(51) Int. Cl.
*G01D 5/347* (2006.01)
*G01D 5/38* (2006.01)

(56) References Cited

U.S. PATENT DOCUMENTS

| | | | | |
|---|---|---|---|---|
| 4,676,645 A * | 6/1987 | Taniguchi | ................ | G01D 5/38 250/237 G |
| 5,000,542 A * | 3/1991 | Nishimura | ............... | G01D 5/38 250/237 G |
| 5,038,032 A * | 8/1991 | Nishimura | ............... | G01D 5/38 250/231.16 |
| 8,885,172 B2 * | 11/2014 | de Groot | ............ | G01B 9/02003 356/488 |
| 9,146,093 B2 * | 9/2015 | Demarest | ................ | G01B 11/14 |
| 2003/0202189 A1 * | 10/2003 | Tamiya | .................... | G01D 5/38 356/494 |
| 2006/0139654 A1 * | 6/2006 | Takahashi | ................ | G01D 5/38 356/494 |
| 2006/0145066 A1 * | 7/2006 | Tamiya | .................... | G01D 5/38 250/231.13 |
| 2006/0250900 A1 * | 11/2006 | Tamiya | .................. | G01D 5/347 369/1 |
| 2007/0195334 A1 * | 8/2007 | Tamiya | .................... | G01D 5/38 356/616 |
| 2009/0257066 A1 * | 10/2009 | Tamiya | .................... | G01D 5/38 356/482 |
| 2010/0182611 A1 * | 7/2010 | Sudoh | ................ | G01B 9/02027 356/498 |
| 2011/0255096 A1 * | 10/2011 | Deck | ........................ | G01D 5/38 356/488 |
| 2011/0310396 A1 * | 12/2011 | Tamiya | .................... | G01D 5/38 356/498 |
| 2012/0287441 A1 * | 11/2012 | Kuroda | .................... | G01D 5/38 356/499 |
| 2013/0114087 A1 * | 5/2013 | Deck | ........................ | G01B 9/0209 356/486 |
| 2013/0214137 A1 * | 8/2013 | Hayashi | ................ | G01D 5/345 250/225 |
| 2013/0250307 A1 * | 9/2013 | Tamiya | ............. | G01B 9/02015 356/498 |

* cited by examiner

DISPLACEMENT DETECTING DEVICE

BACKGROUND OF THE INVENTION

Field of the Invention

The present invention relates to a displacement detecting device that detects displacement of a surface to be measured with a noncontact sensor using light emitted from a light source, more specifically, to a technique of detecting displacement in a direction perpendicular to the surface to be measured.

Description of the Related Art

Conventionally, displacement detecting devices using light have been widely utilized as a device measuring displacement or shape of a surface to be measured in a noncontact manner. A typical example thereof includes a method of irradiating the surface to be measured with laser light to thereby detect positional changes of the reflected light by using PSD. However, this method is largely affected by a slope of the surface to be measured, and reduces sensitivity, which leads to a problem of decreasing resolution in measurement with the increase in an area to be measured.

In contrast to this, the Michelson interferometer is used by the use of the surface to be measured as a mirror. This method has a wide detection range and is excellent in linearity obtained. However, with an increase in the area to be measured, this method is affected by the change in the wavelength of a light source and the change in the index of refraction of air.

In contrast, light emitted from the light source is caused to converge on the surface to be measured with an objective lens, and the reflected light reflected on the surface to be measured is caused to converge with an astigmatic optical element and enter a light-receiving element, whereby a focus error signal is generated through an astigmatism method. Then, a servomechanism is driven using the focus error signal to thereby move the objective lens so that a focal point of the objective lens is placed on the surface to be measured. At this time, there is a system in which the displacement of the surface to be measured is detected by reading marks on a linear scale attached integrally with the objective lens via a linkage member (refer to, for example, Patent Literature 1). This method is less likely to receive an effect of variation in the slope of the surface to be measured, and is advantageous in that measurement can be performed to a large measurement area with a high resolution.

The displacement detecting device disclosed in Patent Literature 1 has an objective lens with high numerical aperture (NA) to thereby reduce the beam diameter converging on the surface to be measured, in order to detect the displacement with a high accuracy. For example, it is possible to achieve the detection accuracy on the linear scale in a range of several nanometers to several hundred nanometers by setting the beam diameter of an image formed on the surface to be measured to approximately 2 μm.

RELATED ART DOCUMENT

Patent Document

Patent Literature 1: Japanese Patent Laid-Open Publication No. H05-89480

SUMMARY OF THE INVENTION

Disclosure of the Invention

Problems to be Solved by the Invention

However, the conventional displacement detecting device described in Patent Literature 1 vertically moves the objective lens in the optical axis direction through the use of, for example, a driving mechanism such as an actuator using a magnet and a coil. Therefore, the mechanical response frequency of the vertical movement of the objective lens is restricted by the structure or weight of the actuator. As a result, with the displacement detecting device described in Patent Literature 1, it is difficult to measure an object to be measured which vibrates at a high speed. Furthermore, although detection points can be narrowed down, there is a problem in which measurement is affected by foreign substances on the object to be measured or slight change in shapes that resemble the shape of beam, thereby causing large errors. This limits applications of the device.

An object of the present invention is to provide a displacement detecting device capable of detecting displacement of a member to be measured in a height direction with a high accuracy, and of making measurements in a fast and stable manner.

Means for Solving the Problem

In order to solve the problem described above and achieve the object of the present invention, a displacement detecting device according to one aspect of the present invention includes a light source performs irradiation with light, a light-beam splitting section, a reflection/transmission section, a phase plate, a transmission-type diffraction grating, a light-beam combining section, a light-receiving section, and a relative position information output unit.

The light-beam splitting section splits the light emitted from the light source into a first light beam caused to enter a member to be measured and a second light beam serving as a reference light. The reflection/transmission section transmits or reflects the first light beam in accordance with a polarization direction of the first light beam, and causes the first light beam to enter the member to be measured. The phase plate changes a polarization direction of the first light beam. The reference reflection section reflects the second light beam split by the light-beam splitting section. The diffraction-type grating diffracts the first light beam reflected by the surface to be measured of the member to be measured, and causes the diffracted first light beam to enter the reflection/transmission section again. The light-beam combining section combines the first light beam diffracted by the diffraction grating with the second light beam reflected by the reference reflection section. The light-receiving section receives interference light of the first light beam and the second light beam combined by the light-beam combining section. The relative position information output unit outputs information on displacement of the surface to be measured of the member to be measured in a height direction on the basis of an intensity of interference light received by the light-receiving section. In addition, the reflection/transmission section guides the first light beam to a specific position of the member to be measured in the case where the member to be measured is at a reference position. Furthermore, an optical path of the first light beam reflected again by the member to be measured overlaps with an optical path of the first light beam reflected at the specific position of the member to be measured.

Moreover, an optical path length of the first light beam from the light-beam splitting section to the light-beam combining section and an optical path length of the second light beam from the light-beam splitting section to the light-beam combining section are set substantially equal to each other.

Effects of the Invention

According to the displacement detecting device of the present invention, a conventional driving mechanism is not needed, whereby it is possible to suppress heat generated at the time of operation. Furthermore, there is no need to drive the driving mechanism, and thus it is possible to solve the problem concerning response frequency, whereby it is possible to expand applications of the device.

Moreover, since the reflection/transmission section guides the first light beam to a specific position of the member to be measured, it is possible to overlap the optical paths of the first light beam entering the surface to be measured of the member to be measured. This makes it possible to measure one specific point on the surface to be measured, and thus it is possible to measure a much narrower area on the surface to be measured.

In addition, the optical path length of the first light beam and the optical path length of the second light beam are set equal to each other. Therefore, it is possible to equalize the effects thereof on the first light beam and the second light beam even if the wavelength of the light source varies due to a change in atmospheric pressure, humidity, and temperatures. As a result, there is no need to make atmospheric pressure correction, humidity correction, and temperature correction, and thus it is possible to stably make measurements.

BRIEF DESCRIPTION OF THE DRAWINGS

FIG. 2A is a cross-sectional view illustrating one example of the diffraction grating, and FIG. 2B is a cross-sectional view illustrating a second example of the diffraction grating.

DESCRIPTION OF THE PREFERRED EMBODIMENTS

Hereinafter, a displacement detecting device according to an exemplary embodiment of the present invention will be described with reference to FIG. 1 to FIG. 8. Note that the same reference signs are attached to common units in each of the drawings. In addition, the present invention is not limited to embodiments described below.

Furthermore, each lens described below may be a single lens, or may be a lens group.

1. Displacement Detecting Device According to the First Exemplary Embodiment

First, the configuration of the displacement detecting device according to the first exemplary embodiment of the present invention (hereinafter, referred to as "this embodiment") will be described with reference to FIG. 1 to FIG. 3.

1-1. Configuration Example of Displacement Detecting Device

Figure 1:
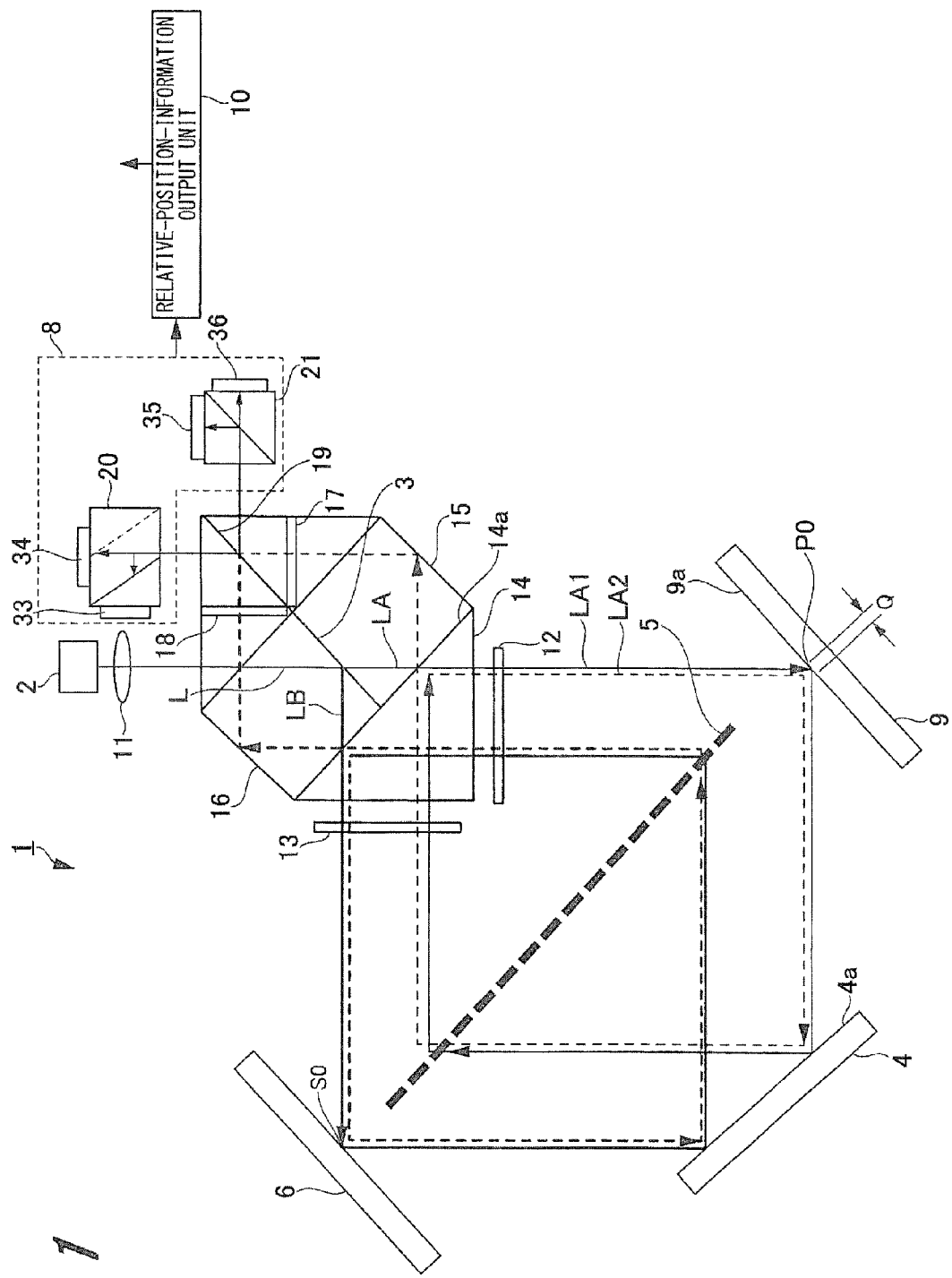
FIG. 1 is a schematic configuration diagram illustrating a configuration of a displacement detecting device according to a first exemplary embodiment of the present invention.

FIG. 1 is a schematic configuration diagram illustrating a configuration of the displacement detecting device.

The displacement detecting device 1 according to this embodiment can detect displacement in the vertical diction on a surface to be measured by using a transmission-type diffraction grating. As illustrated in FIG. 1, the displacement detecting device 1 includes a light source 2, a light-beam splitting section 3 that splits light emitted from the light source into two light beams LA and LB, a transmission-type diffraction grating 5, a mirror 4, which is one example of a reflection member, a reference reflection section 6, and a light-receiving section 8.

Furthermore, the displacement detecting device 1 includes a light-beam combining section 19, a reflection/transmission section 14 that reflects or transmits light according to polarization of the light beams LA and LB, a first phase plate 12, and a second phase plate 13. Moreover, the displacement detecting device 1 is provided with a relative position information output unit 10 that outputs information (displacement information) on relative positions of a member 9 to be measured, in a direction perpendicular to the surface to be measured, namely, in a height direction of the member 9.

The light source 2 includes, for example, a semiconductor laser diode, a superluminescent diode, gas laser, solid-state laser, a light-emitting diode and the like.

When a light source having a long coherence length is used as the light source 2, the displacement detecting device 1 is less likely to be affected by a difference in optical path lengths between the object light and the reference light due to a tilt or the like of the surface to be measured of the member 9 to be measured, thereby resulting in the increase in allowable range of the tilt. Furthermore, with a reduction in the coherence length of the light source 2, it is possible to prevent noises caused by interference of unwanted stray lights, and thus measurement with a higher accuracy can be carried out.

Furthermore, when a single-mode laser is used as the light source 2, it is desirable to control temperatures of the light source 2 in order to stabilize wavelengths. In addition, it may be possible to apply high frequency superposition or the like to single-mode laser light to thereby reduce coherence of light. Moreover, also in the case where a multi-mode laser is used, it becomes possible to prevent noises caused by interference of unwanted stray lights and to make further stable measurements, by controlling temperatures of the light source 2 with a Peltier device or the like.

Note that the number of light sources 2 is not limited to one, and it may be possible to arrange plural light sources 2, and to superimpose lights from the light sources 2, thereby increasing the light quantity.

The light L emitted from the light source 2 enters the light-beam splitting section 3. Note that a lens 11 including a collimating lens or the like is disposed between the light source 2 and the light-beam splitting section 3. The lens 11 collimates light emitted from the light source 2 into a parallel beam. Therefore, the light collimated into a parallel beam by the lens 11 enters the light-beam splitting section 3.

The light-beam splitting section 3 splits the collimated light into a first light beam LA serving as an object light and a second light beam LB serving as a reference light. The member 9 to be measured is irradiated with the first light beam LA, whereas the reference reflection section 6 is irradiated with the second light beam LB. For example, a half mirror that equally distributes the entered light L is used for the light-beam splitting section 3.

Furthermore, a polarization plate may be provided between the light source 2 and the light-beam splitting section 3. With this configuration, it is possible to eliminate noise and leaked light, which slightly exists as a polarization component straightly running through each polarization.

The reflection/transmission section 14 and the first phase plate 12 are disposed between the light-beam splitting section 3 and the member 9 to be measured. The reflection/transmission section 14 is constituted, for example, of a polarized beam splitter. In this embodiment, the reflection/transmission section 14 allows light with p-polarization to pass through, and reflects light with s-polarization.

The first phase plate 12 changes polarization directions of the light that passes therethrough, and is constituted, for example, of a quarter wave plate. For this reason, in the case where the polarization direction of light that passes therethrough is of p-polarization, the light is changed into a circularly polarized light that rotates in a certain direction. Furthermore, in the case where the light that passes through the plate 12 is a circularly polarized light, the polarization direction of which rotates in a certain direction, the light is changed into a light with s-polarization. Furthermore, in the case where the polarization direction of the light that passes through the plate 12 is of s-polarization, the light is changed into a circularly polarized light that rotates in a direction opposite to the certain direction. In addition, in the case where the light that passes through the plate 12 is the circularly polarized light that rotates in a direction opposite to the certain direction, the light is changed into a light with p-polarization.

In the case where the member 9 to be measured is disposed at a reference position, the first light beam LA, which has passed through the first phase plate 12, enters a reference point (specific position) P0, which is located at almost the same position, on the surface 9a to be measured of the member 9 to be measured. Then, the member 9 to be measured reflects the first light beam LA that has entered the surface 9a to be measured.

The mirror 4 is disposed on a direction of travel of the first light beam LA reflected by the member 9 to be measured. Furthermore, the transmission-type diffraction grating 5 is disposed so as to face the mirror 4. The mirror 4 reflects, toward the diffraction grating 5, the first light beam LA reflected by the member 9 to be measured. The diffraction grating 5 transmits the incident light, and diffracts the incident light.

The diffraction grating 5 is disposed substantially at a right angle with respect to the surface 9a to be measured of the member 9 to be measured, more specifically, is disposed so that an angle formed by the diffraction surface of the diffraction grating 5 and the surface 9a to be measured of the member 9 to be measured is substantially 90°.

Furthermore, the mirror 4 is disposed so that a reflection surface 4a thereof is substantially in parallel to the diffraction surface of the diffraction grating 5. For this reason, the angle formed by the reflection surface 4a of the mirror 4 and the surface 9a to be measured of the member 9 to be measured is substantially 90°. Accordingly, for example, light entering the member 9 to be measured at an angle $\theta 1$ of incidence enters the diffraction grating 5 at an angle $\pi/2-\theta 1$ of incidence. Light entering the member 9 to be measured at an angle $\theta 2$ of incidence enters the diffraction grating 5 at an angle $\pi/2-\theta 2$ of incidence (see FIG. 4).

Note that the accuracy of position of the diffraction grating 5 with respect to the member 9 to be measured and the accuracy of position of the mirror 4 with respect to the member 9 to be measured are each set so as to vary according to measurement accuracy required for the displacement detecting device 1. More specifically, in the case where the displacement detecting device 1 is required to have high accuracy, it is preferable to arrange the diffraction grating 5 and the mirror 4 in a range of 90°±0.5° with respect to the surface to be measured of the member 9 to be measured. On the other hand, in the case where the displacement detecting device 1 is used to make measurements with lower accuracy such as for a machine tool, it is sufficient to dispose the diffraction grating in a range of 90°±2° with respect to the surface to be measured of the member to be measured.

A grating pitch $\Lambda$ of the diffraction grating 5 may or may not be set so that the angle of diffraction is substantially equal to the angle of incidence to the diffraction grating 5. More specifically, it is preferable that the grating pitch $\Lambda$ of the diffraction grating 5 is set to a value that satisfies following Equation 1, where $\theta 1$ is the angle of incidence to the member 9 to be measured for the first time, $\theta 2$ is the angle of incidence for the second time, and $\lambda$ is a wavelength.

$$\Lambda = n\lambda/(\sin(\pi/2-\theta 1)+\sin(\pi/2-\theta 2)) \quad \text{[Equation 1]}$$

Note that n is a positive order.

Figures 2A, 2B:
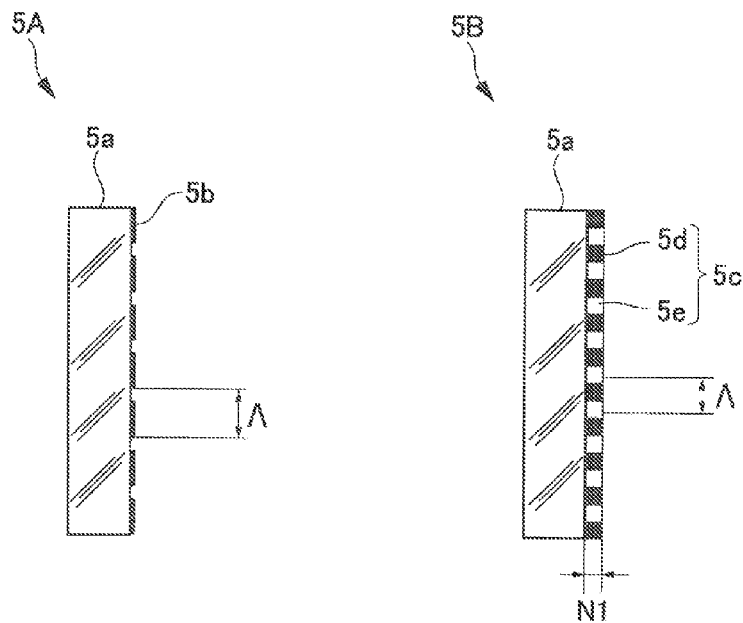
FIGS. 2A and 2B are diagrams each illustrating a diffraction grating of the displacement detecting device according to the first exemplary embodiment of the present invention.

For the diffraction grating, it may be possible to use, for example, diffraction gratings 5A and 5B as illustrated in FIG. 2A and FIG. 2B.

FIG. 2A is a cross-sectional view illustrating one example of the diffraction grating. FIG. 2B is a cross-sectional view illustrating another example of the diffraction grating.

The diffraction grating 5A illustrated in FIG. 2A is obtained by forming a grating portion 5b made of, for example, chrome (Cr) on one surface of a substantially transparent glass substrate 5a. Generally, the grating portion 5b is formed by vacuum deposition of a thin membrane of chrome or the like on one surface of the glass substrate 5a, and thus the thickness of the grating portion 5b is 1 µm or less.

The diffraction grating 5B illustrated in FIG. 2B is a so-called volume-type hologram using a photographic plate. Although absorption hologram may be used, a phase-type hologram is described herein. A grating portion 5c of this diffraction grating 5B is formed in, for example, the following way. First, a silver halide emulsion sensitive to light is coated on one surface of the glass substrate 5a, and exposures are performed to form an interference pattern. After development, bleaching is performed. With these operations, there are formed a portion 5d where silver particles remain and a portion 5e where no silver particle remains, on the grating portion 5c. Here, the index of refraction becomes high in the portion 5d where silver particles remain, and the index of refraction becomes low in the portion 5e where no silver particle remains. Namely, a phase-type hologram is obtained. Furthermore, a hologram-recording photopolymer may be used as the material instead of the photographic plate.

In the case of the diffraction grating 5B having the configuration as described above, when light enters at a predetermined angle (angle of incidence), the light is outputted (diffracted) at a predetermined angle (angle of diffraction). Furthermore, when the Bragg condition expressed as Equation 1 is satisfied, it is possible to maximize the output of the diffracted light diffracted by the diffraction grating 5B. Namely, it is possible to prevent a reduction in the light quantity of the diffracted light diffracted by the diffraction grating 5B.

It is preferable to set the thickness N1 of the grating portion 5c of this diffraction grating 5B to be four or more times the grating pitch Λ. However, considering that light is absorbed by the grating portion 5c, it is preferable to set the thickness N1 of the grating portion 5c to be approximately four to twenty times the grating pitch Λ.

Furthermore, the diffraction grating 5B composed of volume-type hologram as illustrated in FIG. 2B can enhance an efficiency of diffraction of the first light beam LA reflected from the member 9 to be measured or the second light beam LB reflected from the reference reflection section 6, via the mirror 4 and can reduce the noise of signals.

Returning to FIG. 1, the reference reflection section 6 is disposed at the position facing the member 9 to be measured with the diffraction grating 5 sandwiched therebetween. In addition, the reflection/transmission section 14 described above and the second phase plate 13 are disposed between the light-beam splitting section 3 and the reference reflection section 6. The second phase plate 13 has the same configuration as the first phase plate 12, and thus explanation thereof will be omitted herein.

The second light beam LB that has passed through the second phase plate enters the reference reflection section 6. The second light beam LB enters an irradiation spot S0 on the reflection surface of the reference reflection section 6. Then, the reference reflection section 6 reflects the entering second light beam LB toward the mirror 4.

Furthermore, the reflection surface of the reference reflection section 6 is disposed so as to be substantially in parallel to the surface 9a to be measured of the member 9 to be measured. Accordingly, the reference reflection section 6, the diffraction grating 5, and the mirror 4 are arranged so that the angle formed by the reflection surface of the reference reflection section 6, the diffraction surface of the diffraction grating 5, and the reflection surface 4a of the mirror 4 is substantially 90°.

Moreover, the light-beam combining section 19, the first auxiliary mirror 15, and the second auxiliary mirror 16 are disposed in the vicinity of the light-beam splitting section 3. The first auxiliary mirror 15 reflects, toward the light-beam combining section 19, the first light beam LA which has passed through the second phase plate 13 and has passed through the reflection/transmission surface 14a of the reflection/transmission section 14. The second auxiliary mirror 16 reflects, toward the light-beam combining section 19, the second light beam LB which has passed through the first phase plate 12 and has passed through the reflection/transmission surface 14a of the reflection/transmission section 14.

In addition, a third phase plate 17 is disposed between the light-beam combining section 19 and the first auxiliary mirror 15, and a fourth phase plate 18 is disposed between the light-beam combining section 19 and the second auxiliary mirror 16. For the third phase plate 17 and the fourth phase plate 18, the optical axis of each of the phase plates is set so that the first light beam LA and the second light beam LB passing therethrough are changed into a circularly polarized light and rotate in directions opposite to each other.

In addition, the light-beam combining section 19 combines the first light beam LA with the second light beam LB, and splits the combined light into two lights again. Then, the light-beam combining section 19 guides the split lights to the light-receiving section 8.

The light-receiving section 8 includes a first polarized beam splitter 20 and a second polarized beam splitter 21.

The first polarized beam splitter 20 is disposed so that the polarization direction of the incident light beam is tilted at 45° with respect to the incident surface. A first light-receiving element 33 and a second light-receiving element 34 are provided on the light-output side of this first polarized beam splitter 20. In addition, a third light-receiving element 35 and a fourth light-receiving element 36 are provided on the light-output side of the second polarized beam splitter 21.

These first polarized beam splitter 20 and second polarized beam splitter 21 each reflect interference light having an s-polarization component and transmits interference light having a p-polarization component, thereby splitting light. In addition, the light-receiving section 8 is connected with the relative position information output unit 10.

Figure 3:
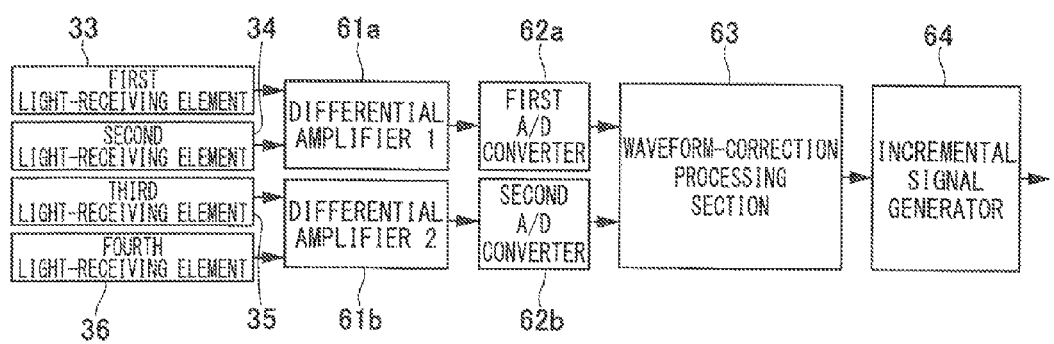
FIG. 3 is an explanatory view illustrating main sections of the displacement detecting device according to the first exemplary embodiment of the present invention.

FIG. 3 is a block diagram schematically illustrating a configuration of the relative position information output unit 10 of the displacement detecting device 1 according to this embodiment.

As illustrated in FIG. 3, the relative position information output unit 10 includes a first differential amplifier 61a, a second differential amplifier 61b, a first A/D converter 62a, a second A/D converter 62b, a waveform-correction processing section 63, and an incremental signal generator 64.

The first differential amplifier 61a is connected with the first light-receiving element 33 and the second light-receiving element 34. The second differential amplifier 61b is connected with the third light-receiving element 35 and the fourth light-receiving element 36. Furthermore, the first differential amplifier 61a is connected with the first A/D converter 62a, and the second differential amplifier 61b is connected with the second A/D converter 62b. In addition, the first A/D converter 62a and the second A/D converter 62b are each connected with the waveform-correction processing section 63.

Furthermore, the light-beam splitting section 3, the reflection/transmission section 14, the first auxiliary mirror 15, the second auxiliary mirror 16, the third phase plate 17, the fourth phase plate 18, and the light-beam combining section 19 are formed integrally into one hexagonal prism. Note that there are formed plural plate-shaped members having respective functions of the light-beam splitting section 3, the reflection/transmission section 14, the first auxiliary mirror 15, the second auxiliary mirror 16, the third phase plate 17, the fourth phase plate 18, and the light-beam combining section 19, all having the same index of refraction. Then, these plate-shaped members are placed at predetermined positions, and are formed integrally with a material having the same index of fraction as these plate-shaped members. Accordingly, the light-beam splitting section 3, the reflection/transmission section 14, the first auxiliary mirror 15, the second auxiliary mirror 16, the third phase plate 17, the fourth phase plate 18, and the light-beam combining section 19 are formed in one hexagonal prism.

Furthermore, the light-beam splitting section 3, the reflection/transmission section 14, the first auxiliary mirror 15, the second auxiliary mirror 16, the third phase plate 17, the fourth phase plate 18, and the light-beam combining section 19 are formed on predetermined faces of plural prisms having the same index of refraction. Then, the hexagonal prism may be formed by attaching these plural prisms together. In addition, in the case where functions can be added through film forming, the hexagonal prism may be formed by formation of the film on the surface of each of the prisms.

Note that the method of forming the hexagonal prism constituting the light-beam splitting section 3, the reflection/transmission section 14, the first auxiliary mirror 15, the second auxiliary mirror 16, the third phase plate 17, the fourth phase plate 18, and the light-beam combining section 19 is not limited to those described above. Various methods other than these may be used.

1-2. Operations of Displacement Detecting Device

Next, operations performed by the displacement detecting device 1 according to this embodiment will be described with reference to FIG. 1 to FIG. 4.

Figure 4:
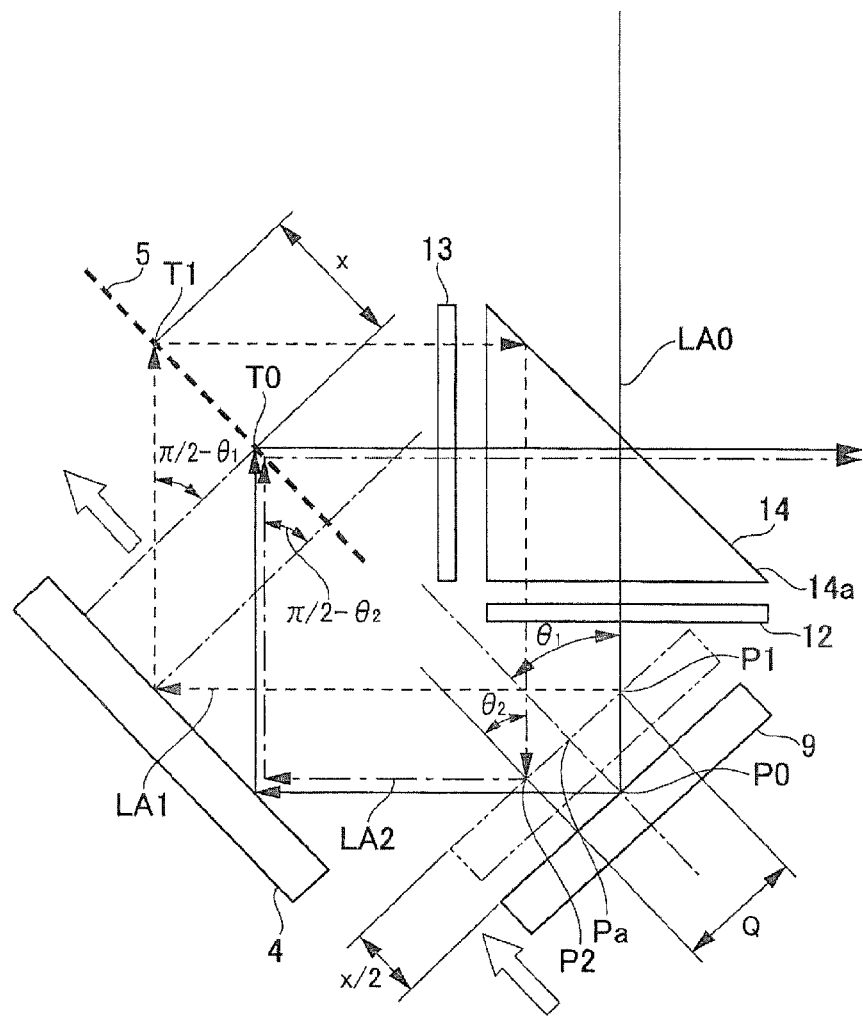
FIG. 4 is a block diagram illustrating a relative position information output unit of the displacement detecting device according to the first exemplary embodiment of the present invention.

FIG. 4 is an explanatory view illustrating main sections of the displacement detecting device.

As illustrated in FIG. 1, light L emitted from the light source is collimated by the lens 11 into parallel light. Then, the parallel beam collimated through the lens 11 enters the light-beam splitting section 3. The light entering the light-beam splitting section 3 is split into the first light beam LA and the second light beam LB. In addition, the split first light beam LA and the split second light beam LB each enter the reflection/transmission section 14.

Note that the first light beam LA and the second light beam LB split by the light-beam splitting section 3 are lights with p-polarization. Accordingly, the reflection/transmission section 14 allows the incident first light beam LA and second light beam LB to pass through.

Next, the first phase plate 12 is irradiated with the first light beam LA passing through the reflection/transmission section 14, whereas the second phase plate 13 is irradiated with the second light beam LB. Then, the first light beam LA and the second light beam LB each become a circularly polarized light.

As illustrated in FIG. 4, in the case where the member 9 to be measured is located at the reference position, the first light beam LA0 serving as a circularly polarized light enters the reference point P0 on the member 9 to be measured at an angle θ of incidence. Then, the first light beam LA0 performs the first reflection by the member 9 to be measured, and enters an optional diffraction position T0 on the diffraction grating 5 at an angle π/2−θ of incidence, via the mirror 4.

The first light beam LA0 is diffracted by the diffraction grating 5, and reaches the second phase plate 13. Then, the first light beam LA0 passes through the second phase plate 13 to thereby serve as s-polarization, and enters the reflection/transmission section 14 again. Since the first light beam LA0 is of s-polarization, the first light beam LA0 is reflected by the reflection/transmission surface 14a of the reflection/transmission section 14. Then, the first light beam LA0 passes through the first phase plate 12 again to thereby serve as a circularly polarized light. Note that the circularly polarized light of the first light beam LA0 rotates in a direction opposite to that when the first light beam LA0 passes through the first phase plate 12 for the first time.

Here, the reflection/transmission surface 14a of the reflection/transmission section 14 is disposed so that the first light beam LA0 can enter the same reference point P0 at the same angle θ of incidence as those for the first time. Accordingly, in the case where the member 9 to be measured is located at the reference position, the first light beam LA0 enters, at the angle θ of incidence, the reference point P0 on the member 9 to be measured, which is located at substantially the same position as that for the first time.

After that, the light follows the same optical path as that for the first time, is diffracted by the diffraction grating 5, and then passes through the second phase plate 13 again. Note that the optical path of the first light beam LA0 entering the reference point P0 on the member 9 to be measured and shown as the solid line in FIG. 4 is referred to as a reference optical path.

Here, the first light beam LA0 is a circularly polarized light of which rotational direction is opposite to that for the first time. Thus, after passing through the second phase plate 13, the first light beam LA0 becomes a p-polarization beam. Thus, the first light beam LA0, which has passed through the second phase plate 13, passes through the reflection/transmission surface 14a of the reflection/transmission section 14. Then, the first light beam LA0 enters the light-beam combining section 19 through the first auxiliary mirror 15 and the third phase plate 17.

As described above, in this embodiment, in the case where the member 9 to be measured is located at the reference position, almost the same position, which is the reference position P0 on the member 9 to be measured, between the first time and the second time can be irradiated with the first light beam LA. With this configuration, it is possible to minimize the distance Q between detection points on the member 9 to be measured.

Furthermore, as illustrated in FIG. 2, the second light beam LB serving as the circularly polarized light enters the irradiation spot S0 on the reference reflection section 6. In addition, the second light beam LB is reflected by the reference reflection section 6, and enters the diffraction grating 5 through the mirror 4. The second light beam LB diffracted by the diffraction grating 5 becomes an s-polarization beam through the first phase plate 12, and is reflected by the reflection/transmission section 14. Then, the second light beam LB becomes a circularly polarized light again through the second phase plate 13. After this, the light follows the same optical path as that for the first time, and enters the first phase plate 12.

On the first phase plate 12, as with the first light beam LA, the second light beam LB becomes a p-polarization beam, and passes through the reflection/transmission section 14. Then, the second light beam LB enters the light-beam combining section 19 through the second auxiliary mirror 16 and the fourth phase plate 18.

Here, the reference reflection section 6 and the mirror 4 are disposed so that the optical path length of the first light beam LA from the light-beam splitting section 3 to the light-beam combining section 19 and the optical path length of the second light beam LB from the light-beam splitting section 3 to the light-beam combining section 19 are equal to each other. With this configuration, at the time of manufacturing the displacement detecting device 1, it is possible to easily adjust the optical path length of the first light beam LA, the optical path length of the second light beam LB, and the angle of optical axis. As a result, it is possible to stably make measurements without making atmospheric pressure correction, humidity correction, or temperature correction under any environmental circumstances.

Moreover, the first light beam LA and the second light beam LB are caused to enter the same diffraction grating 5 to be diffracted. With this configuration, even if the angle of diffraction of the diffraction grating 5 changes due to changes in temperatures, it is possible to equalize the effect thereof on the first light beam LA and the second light beam LB.

Here, description will be made of a case where the member 9 to be measured is moved from the reference position toward the height direction by x/2 as illustrated in FIG. 4.

As illustrated FIG. 4, when the member 9 to be measured is moved from the reference position toward the height direction by x/2, the irradiation position of the first light beam LA1 for the first time is moved from the reference point P0 on the member 9 to be measured to a first irradiation position P1. Note that the angle θ1 of incidence to the member 9 to be measured is equal to the angle θ of incidence of the first light beam LA0 with which the reference point P0 is irradiated. Then, the first light beam LA1 follows the optical path shown as the dotted line, and enters the diffraction grating 5 at an angle π/2−θ1 of incidence. Note that, since the angles of incidence to the member 9 to be measured are equal, the angle π/2−θ1 of incidence of the first light beam LA1 to the diffraction grating 5 at the time of movement is equal to the angle π/2−θ of incidence of the first light beam LA0, which follows the reference optical path, to the diffraction grating 5.

Furthermore, the incident position of the first light beam LA1 to the diffraction grating 5 moves from the diffraction position T0 to a diffraction position T1. Here, the diffraction grating 5 is disposed substantially at a right angle with respect to the surface to be measured of the member 9 to be measured, and thus, a distance between the diffraction position T0 and the diffraction position T1 is x, which is twice as long as the distance by which the member 9 to be measured moves. Then, a phase corresponding to the wave number corresponding to x, which is the distance by which the diffracting grating 5 moves, is added to the first light beam LA.

Then, the first light beam LA1 is reflected by the reflection/transmission section 14, and enters the member 9 to be measured again. The irradiation position of the first light beam LA2 for the second time is moved from the first irradiation position P1 on the member 9 to be measured to the second irradiation position P2. Note that the angle θ2 of incidence to the member 9 to be measured is equal to the angle θ of incidence of the first light beam LA0 with which the reference point P0 is irradiated, and the angle θ1 of incidence of the first light beam LA1 for the first time.

Furthermore, the first light beam LA2 for the second time, with which the member 9 to be measured is irradiated follows the optical path shown as the dot-and-dash line, which matches with the reference optical path. Accordingly, the first light beam LA2 enters the diffraction position T0 of the diffraction grating 5. Furthermore, the optical path length of the first light beam LA is always constant even if the member 9 to be measured is moved in the height direction. Namely, the wavelength of the first light beam LA does not change. Therefore, a phase corresponding to the wave number corresponding to x, which is the distance from the diffraction position T0 to the diffraction position T1 on the diffraction grating 5, is added to the first light beam LA.

In addition, the displacement detecting device 1 detects a center position Pa between the first irradiation position P1 and the second irradiation position P2 as a detection position. As illustrated in FIG. 4, the center position Pa is almost equal to the reference position P0. Therefore, even if the member 9 to be measured moves in the height direction, it is possible to detect the displacement of substantially the same detection position at all times. With this configuration, it is possible to make measurements on the surface to be measured in which the distance Q between detection points is narrow.

Returning to FIG. 1, the first light beam LA and the second light beam LB, each of which enters the light-beam combining section 19, are combined by the light-beam combining section 19 to thereby become interference light. Here, the first light beam LA and the second light beam LB are circularly polarized lights, the rotational directions of which are opposite to each other. Furthermore, a phase corresponding to wave number corresponding to the distance of movement on the diffraction grating is added to the first light beam LA. Accordingly, it is possible to obtain interference light of a linearly polarized light rotating in relation to the addition of the phase corresponding to the wave number corresponding to the distance of movement on the diffraction grating to the first light beam LA. Rotation of this linearly polarized light is performed by one turn when the member 9 to be measured moves in the height direction by the grating pitch Λ of the diffraction grating 5.

Furthermore, this interference light is split into two lights by the light-beam combining section 19, and enters the first polarized beam splitter 20 and the second polarized beam splitter 21 of the light-receiving section 8. Then, the first polarized beam splitter 20 and the second polarized beam splitter 21 reflect the interference light having an s-polarization component while allowing the interference light having a p-polarization component to pass through, thereby splitting the light.

The interference light reflected by the first polarized beam splitter 20 is received by the first light-receiving element 33. Furthermore, the interference light passing through the first polarized beam splitter 20 is received by the second light-receiving element 34. Here, signals subjected to opto-electronic conversion with the first light-receiving element 33 and the second light-receiving element 34 serve as signals having phases different from each other by 180 degrees.

In the same way, the interference light reflected by the second polarized beam splitter 21 is received by the third light-receiving element 35. In addition, the interference light passing through the second polarized beam splitter 21 is received by the fourth light-receiving element 36. Here, signals subjected to opto-electronic conversion with the third light-receiving element 35 and the fourth light-receiving element 36 serve as signals having phases different from each other by 180 degrees.

Furthermore, interference signals obtained by the first light-receiving element 33 and the second light-receiving element 34 and interference signals obtained by the third light-receiving element 35 and the fourth light-receiving element 36 can be expressed as $A \cos(2Kx+\delta)$. "A" represents an amplitude of interference, and "K" represents the wave number expressed as $2\pi/\Lambda$. Furthermore, "x" represents an amount of movement of the member 9 to be measured in the height direction, and "δ" represents an initial phase. "Λ" represents a pitch of grating of the diffraction grating 5.

As described above, when the member 9 to be measured moves in the height direction by x/2, the first light beam LA with which the surface to be measured of the member 9 to be measured is irradiated moves from the reference position P0 to the first irradiation position P1. Furthermore, the first light beam LA reflected by the member 9 to be measured moves from the diffraction position T0 on the diffraction grating 5 to the diffraction position T1. In addition, the distance between the diffraction position T0 and the diffraction position T1 is x that is twice the distance between the reference position P0 and the first irradiation position P1. Namely, the amount of movement of the first light beam LA that moves on the diffraction grating 5 is x that is twice the distance of movement of the member 9 to be measured.

Furthermore, the diffraction grating 5 is disposed substantially at a right angle with respect to the surface to be measured of the member 9 to be measured, and thus, even if the position of the member 9 to be measured changes in the height direction, the optical path length of the first light beam LA remains constant at all times. Namely, the wavelength of the first light beam LA remains unchanged. In addition, when the position of the member 9 to be measured is displaced in the height direction, only the position of the light incident to the diffraction grating 5 changes.

Namely, when the member 9 to be measured moves in the height direction by x, the phase of 2Kx is added to the diffracted first light beam LA. Accordingly, the interference light having dark and bright stripes of light with 2 cycles is received by the first light-receiving element 33, the second light-receiving element 34, the third light-receiving element 35, and the fourth light-receiving element 36.

Here, the interference signals obtained by the first light-receiving element 33, the second light-receiving element 34, the third light-receiving element 35, and the fourth light-receiving element 36 do not contain components concerning the wavelength of the light source 2. Therefore, even if the wavelength of the light source changes due to a variation in atmospheric pressure, humidity, or temperatures, such change does not affect the intensity of interference.

Note that, in the present embodiment, the first polarized beam splitter 20 and the second polarized beam splitter 21 are disposed so as to be tilted at 45 degrees with respect to each other. Accordingly, the signals obtained by the third light-receiving element 35 and the fourth light-receiving element 36 are phase-shifted by 90 degrees with respect to the signals obtained by the first light-receiving element 33 and the second light-receiving element 34.

Therefore, it is possible to obtain Lissajous signals, for example, through the use of signals obtained by the first light-receiving element 33 and the second light-receiving element 34 as sin signals, and signals obtained by the third light-receiving element 35 and the fourth light-receiving element 36 as cos signals.

The signals obtained by these light-receiving elements are calculated by the relative-position-information output unit 10, and the amount of displacement of the surface to be measured is counted.

As illustrated in FIG. 4, for example, with the relative-position-information output unit 10 according to the embodiment, the first differential amplifier 61a applies differential amplification to signals, the phases of which obtained by the first light-receiving element 33 and the second light-receiving element 34 differ by 180 degrees from each other, and cancels a DC component of the interference signal.

Then, the first A/D converter 62a applies A/D conversion to the signals, and the waveform-correction processing section 63 corrects amplitudes of signals, offset, and phase. The incremental signal generator 64 calculates the signals as, for example, incremental signals with an A-phase.

Furthermore, in the same way, the second differential amplifier 61b performs differential amplification on signals obtained by the third light-receiving element 35 and the fourth light-receiving element 36, and the second A/D converter 62b performs A/D conversion on the signals. The waveform-correction processing section 63 corrects amplitudes of signals, offset, and phase, and the incremental signal generator 64 outputs the signals as incremental signals with a B-phase, the phase of which differs from the A-phase by 90 degrees.

The incremental signals with two phases obtained as described above are determined as to whether they are positive or negative, through the use of a pulse discriminator or the like, not illustrated, and thus it is possible to detect whether the amount of displacement of the member 9 to be measured in the height direction are in a plus direction or in a minus direction.

Furthermore, it is possible to make measurements as to how many cycles of the cycles described above the intensities of interference light of the first light beam LA and the second light beam LB change, by counting the number of pulses of the incremental signals through the use of a counter, not illustrated. Thereby, the amount of displacement of the member 9 to be measured can be detected.

Note that, in the embodiment, the relative position information outputted by the relative position information output unit 10 may be the incremental signals with two phases described above, or may be signals containing the amount of displacement and direction of displacement calculated on the basis of the incremental signals.

2. Second Exemplary Embodiment

Next, a displacement detecting device according to a second exemplary embodiment will be described with reference to FIG. 5.

Figure 5:
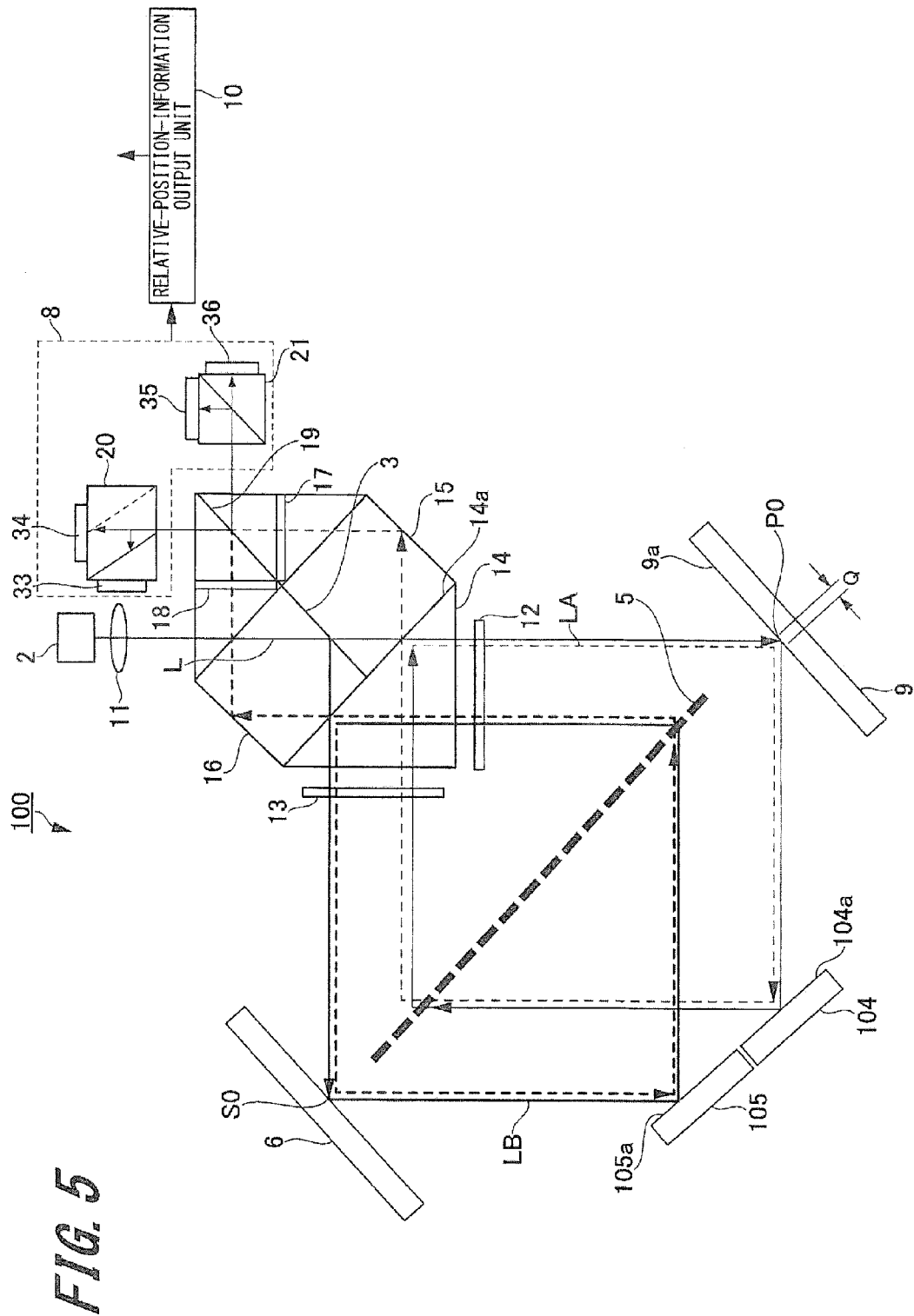
FIG. 5 is a schematic configuration diagram illustrating a configuration of a displacement detecting device according to a second exemplary embodiment of the present invention.

FIG. 5 is a schematic configuration diagram illustrating a configuration of the second exemplary embodiment.

The displacement detecting device 100 according to the second exemplary embodiment differs from the displacement detecting device 1 according to the first exemplary embodiment in that a mirror 104 for the first light beam and a mirror 105 for the second light beam are provided as reflection members. Accordingly, here, the mirror 104 for the first light beam and the mirror 105 for the second light beam will be described. In addition, the same reference signs are attached to portions common to those of the displacement detecting device 1 according to the first exemplary embodiment, and explanation thereof will be omitted.

As illustrated in FIG. 5, the mirror 104 for the first light beam and the mirror 105 for the second light beam are disposed so as to face the diffraction grating 5. The mirror 104 for the first light beam reflects the first light beam LA reflected from the member 9 to be measured, toward the diffraction grating 5. The mirror 105 for the second light beam reflects the second light beam LB reflected from the reference reflection section 6, toward the diffraction grating 5.

A reflection surface 104a of the mirror 104 for the first light beam is disposed substantially in parallel to the diffraction surface of the diffraction grating 5 and substantially at 90° with respect to the surface 9a to be measured of the member 9 to be measured. Furthermore, a reflection surface 105a of the mirror 105 for the second light beam is disposed substantially in parallel to the diffraction surface of the diffraction grating 5 and be substantially at 90° with respect to the reflection surface of the reference reflection section.

Configurations other than these are similar to those of the displacement detecting device 1 according to the first exemplary embodiment, and thus explanation thereof will be omitted. With the displacement detecting device 100 having the configuration as described above, it is possible to obtain an operation and effect similar to that obtained with the displacement detecting device 1 according to the first exemplary embodiment described above.

Furthermore, according to this displacement detecting device 100 of the second exemplary embodiment, it is possible to finely adjust the optical path length or angle of the first light beam LA and the second light beam LB in a separate manner. Thereby, measurements can be less likely to be affected by a variation in the wavelength of the light source 2 due to changes in atmospheric pressure, humidity, or temperature.

3. Third Exemplary Embodiment

Next, a displacement detecting device according to a third exemplary embodiment will be described with reference to FIG. 6.

Figure 6:
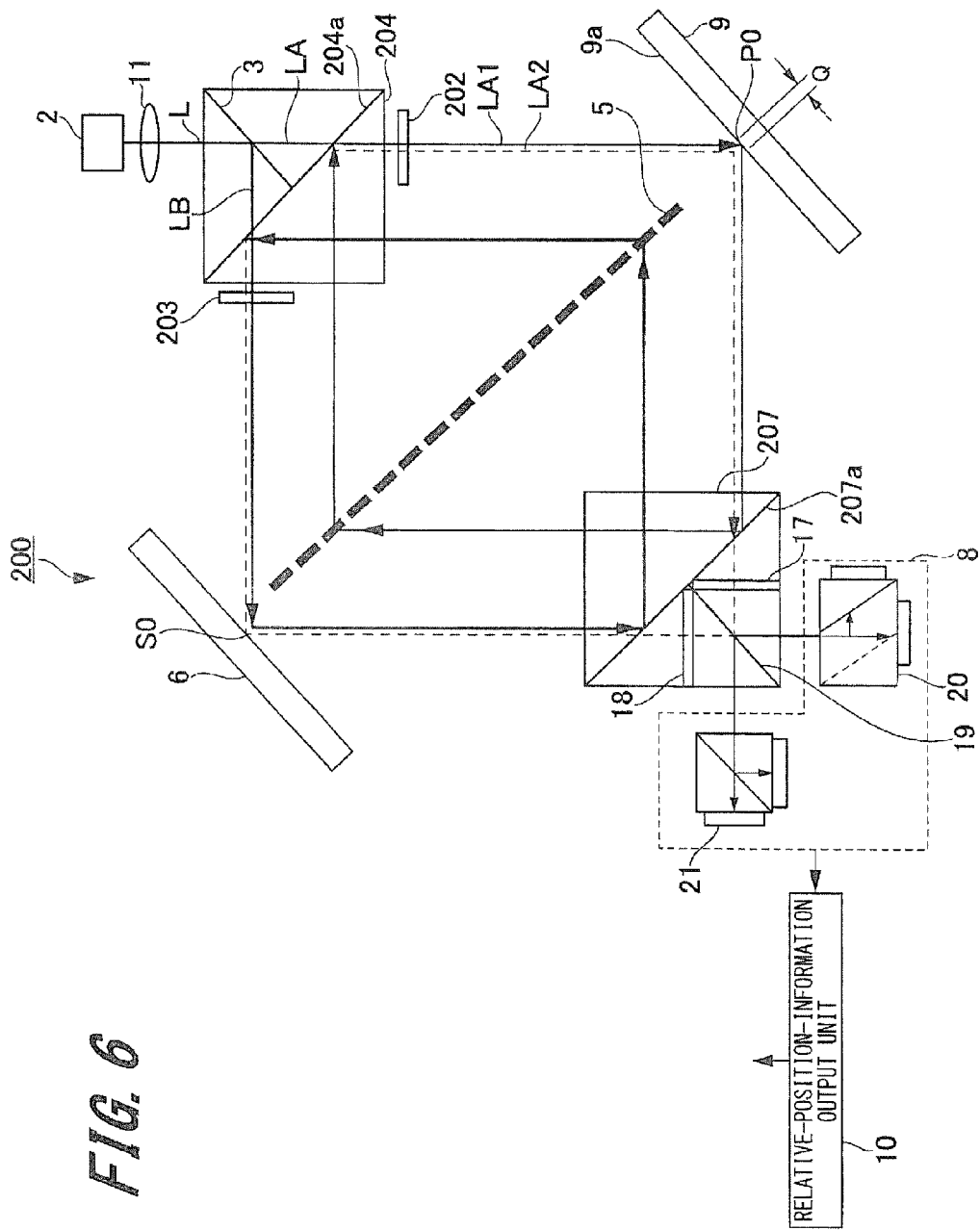
FIG. 6 is a schematic configuration diagram illustrating a configuration of a displacement detecting device according to a third exemplary embodiment of the present invention.

FIG. 6 is a schematic configuration diagram illustrating a configuration of the second exemplary embodiment.

This displacement detecting device 200 according to the third exemplary embodiment differs from the displacement detecting device 1 according to the first exemplary embodiment in that a combining-section-side reflection/transmission section is provided in place of the reflection member. Accordingly, in this exemplary embodiment, the combining-section-side reflection/transmission section will be described. Furthermore, the same reference signs are attached to portions common to those of the displacement detecting device 1 according to the first exemplary embodiment, and explanation thereof will be omitted.

As illustrated in FIG. 6, the displacement detecting device 200 includes a reflection/transmission section 204 and a combining-section-side reflection/transmission section 207. Furthermore, the combining-section-side reflection/transmission section 207 is disposed so as to face the reflection/transmission section 204 with the diffraction grating 5 is disposed therebetween. In addition, the light-beam combining section 19, the third phase plate 17, the fourth phase plate 18, and the light-receiving section 8 are disposed in the vicinity of the combining-section-side reflection/transmission section 207.

The reflection/transmission section 204 has the same configuration as the reflection/transmission section 14 according to the first exemplary embodiment, and thus explanation thereof will be omitted. Furthermore, a first phase plate 202 is disposed between the reflection/transmission section 204 and the member 9 to be measured. A second phase plate 203 is disposed between the reflection/transmission section 204 and the reference reflection section 6.

The first phase plate 202 and the second phase plate 203 are half wave plates. Accordingly, the first phase plate 202 and the second phase plate 203 each change light with p-polarization into light of s-polarization, and change light of s-polarization into light with p-polarization. Furthermore, the first phase plate 202 allows only the first light beam LA to pass through, whereas the second phase plate 203 allows only the second light beam LB to pass through.

The combining-section-side reflection/transmission section 207 is a polarized beam splitter as with the reflection/transmission section 204. The combining-section-side reflection/transmission section 207 allows light with p-polarization to pass through, and reflects light with s-polarization. Furthermore, the combining-section-side reflection/transmission section 207 is disposed so that the reflection/transmission surface 207a thereof is substantially in parallel to the diffraction surface of the diffraction grating 5 and is substantially at 90° with respect to the surface 9a to be measured of the member 9 to be measured and the reflection surface of the reference reflection section 6.

The first light beam LA and the second light beam LB split by the light-beam splitting section 3 are lights of p-polarization. Therefore, the first light beam LA entered from the light-beam splitting section 3 into the reflection/transmission section 204 passes through the reflection/transmission surface 204a, and enters the first phase plate 202. Then, the first light beam LA changes from a p-polarization beam to an s-polarization beam through the first phase plate 202.

The first light beam LA1 that has passed through the first phase plate 202 is reflected by the member 9 to be measured, and enters the combining-section-side reflection/transmission section 207. In addition, since the first light beam LA1 is of s-polarization, the first light beam LA1 is reflected by the reflection/transmission surface 207a of the combining-section-side reflection/transmission section 207, and enters the diffraction grating 5. Then, the first light beam LA, which has become diffracted light, is reflected by the reflection/transmission section 204, and enters the first phase plate 202.

The first light beam LA2 passes through the first phase plate 202 again, and returns to the p-polarization beam. Then, the first light beam LA2 that has become the p-polarization beam is reflected again by the member 9 to be measured. Furthermore, the combining-section-side reflection/transmission section 207 allows the first light beam LA2, which has been reflected again, to pass through. Then, the first light beam LA2 is headed toward the light-beam combining section 19, rather than toward the diffraction grating 5.

Note that the optical path of the second light beam LB is similar to that of the first light beam LA, and thus explanation thereof will be omitted.

Configurations other than these are similar to those of the displacement detecting device 1 according to the first exemplary embodiment, and thus explanation thereof will be omitted. With the displacement detecting device 200 having the configuration as described above, it is possible to obtain an operation and effect similar to that obtained with the displacement detecting device 1 according to the first exemplary embodiment described above.

With this displacement detecting device 200 according to the third exemplary embodiment, the number of times when each of the first light beam LA and the second light beam LB passes through the diffraction grating 5 is one. Thus, it is possible to increase the light quantity transmitted and reduce noises, by minimizing the number of times when the first light beam LA and the second light beam LB pass through the diffraction grating 5.

Furthermore, it is possible to significantly reduce the optical path length of each of the first light beam LA and the second light beam LB as compared with that of each of the first light beam LA and the second light beam LB in the first exemplary embodiment. As a result, the displacement detecting device can be less likely to be affected by fluctuations of air and the like, through the reduction in the optical path length.

4. Application Example of Displacement Detecting Device

Next, application examples of the displacement detecting device according to the first to twelfth exemplary embodiments described above will be described with reference to FIG. 7 and FIG. 8.

Figure 7:
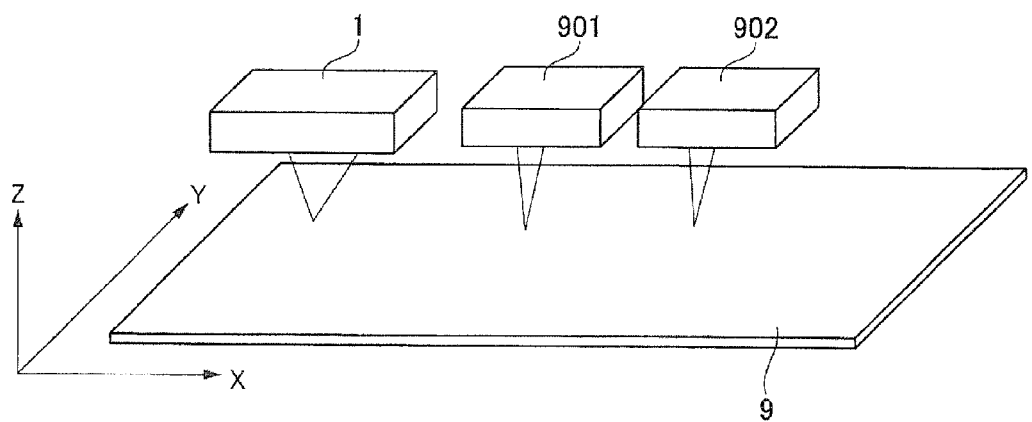
FIG. 7 is a schematic view illustrating a displacement detecting device according to a first application example of the present invention.
Figure 8:
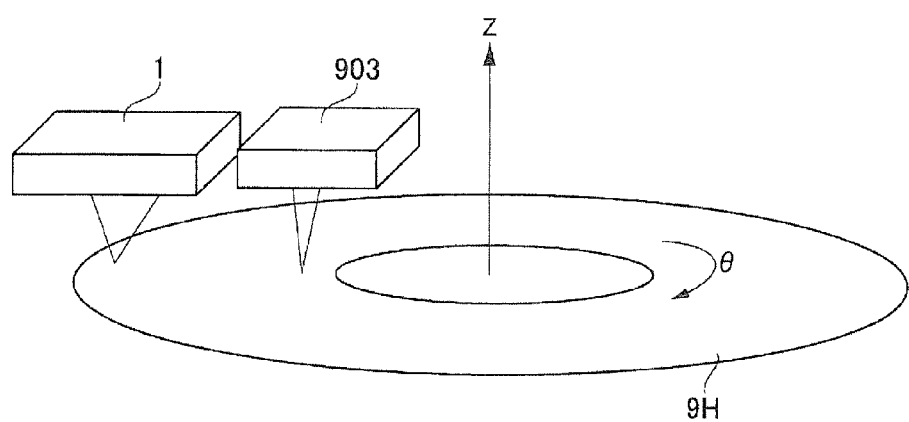
FIG. 8 is a schematic view illustrating a displacement detecting device according to a second application example of the present invention.

FIG. 7 is a schematic view illustrating a first application example. FIG. 8 is a schematic view illustrating a second application example.

Note that the members 9 to be measured of the application examples illustrated in FIG. 7 and FIG. 8 are those using, for example, a diffraction grating scale.

In the application example illustrated in FIG. 7, there are provided an X-axis linear encoder 901 that detects displacement in a first direction X, which is in parallel to the surface to be measured of the member 9 to be measured, and a Y-axis linear encoder 902 that detects displacement in a second direction Y, which is in parallel to the surface to be measured of the member 9 to be measured and is perpendicular to the first direction X. Furthermore, the displacement detecting device 1 according to this embodiment described above is provided for the purpose of detecting the surface to be measured of the member 9 to be measured in a height direction Z.

With the configuration described above, it is possible to measure displacement of the member 9 to be measured in the X axis and the Y axis with the X-axis linear encoder 901 and the Y-axis linear encoder 902, and detect displacement of the surface to be measured of the member 9 to be measured in the height direction, namely, in the Z axis direction with the displacement detecting device 1 according to this embodiment. This makes it possible to perform three-dimensional measurements.

The member 9H to be measured of the application example illustrated in FIG. 8 rotates about the Z axis. Furthermore, this application example includes a rotary encoder 903 that detects angle information on the member 9H to be measured, and the displacement detecting device 1 according to this embodiment described above for detecting the member 9 to be measured in the height direction Z. With this application example, it is possible to detect angle information θ on the member 9H to be measured and displacement in the Z axis direction, whereby it is possible to perform three-dimensional measurements.

Note that the present invention is not limited to the embodiments described above and illustrated in the drawings, and various modifications are possible without departing from the gist of the present invention specified in the scope of claims. In the exemplary embodiments described above, light with which the light source performs irradiation may be supplied not only through gas but also through liquid or vacuum space.

Furthermore, the reference reflection section 6 may be moved in relation to movement of the member 9 to be measured. More specifically, the reference reflection section 6 is moved by the amount equal to the amount of movement of the member 9 to be measured in the height direction. With this configuration, it is possible to add, to the second light beam LB, a phase having a plus/minus sign opposite to the first light beam LA.

BRIEF DESCRIPTION OF THE REFERENCE SYMBOLS 1, 100, 200 . . . displacement detecting device,
2 . . . light source,
3 . . . light-beam splitting section,
4 . . . mirror (reflection member),
4a . . . reflection surface,
5 . . . diffraction grating,
6 . . . reference reflection section,
8 . . . light-receiving section,
9 . . . member to be measured,
9a . . . surface to be measured,
10 . . . relative-position-information output unit,
11 . . . lens,
12, 202 . . . first phase plate,
13, 203 . . . second phase plate,
14, 204 . . . reflection/transmission section,
14a . . . reflection/transmission surface,
19 . . . light-beam combining section,
104 . . . mirror for first light beam,
105 . . . mirror for second light beam,
207 . . . combining-section-side reflection/transmission section,
LA . . . first light beam,
LB . . . second light beam,
P0 . . . reference position (specific position),
P1 . . . first irradiation position,
P2 . . . second irradiation position,
T0 . . . diffraction position,
T1 . . . diffraction position

What is claimed is:
1. A displacement detecting device, comprising:
a light source that emits light;
a light-beam splitting section that splits the light emitted from the light source into a first light beam that enters a member to be measured and a second light beam that serves as a reference light;
a reflection/transmission section that transmits or reflects the first light beam in accordance with a polarization direction of the first light beam, and causes the first light beam to enter the member, after the first light beam has entered the reflection/transmission section;
a phase plate that changes a polarization direction of the first light beam;
a reference reflection section that reflects the second light beam;
a transmission-type diffraction grating that diffracts the first light beam reflected by a surface to be measured of the member to be measured, and causes the diffracted first light beam to enter the reflection/transmission section again;
a light-beam combining section that combines the first light beam diffracted by the diffraction grating with the second light beam reflected by the reference reflection section;
a light-receiving section that receives interference light of the first light beam and the second light beam combined by the light-beam combining section; and
a relative position information output unit that outputs information on displacement of the surface to be mea- sured in a height direction based on an intensity of interference light received by the light-receiving section, wherein when the member is at a reference position, the reflection/transmission section causes the first light beam to enter the member at a specific point on the surface to be measured, and to be reflected by the surface, and when the first light beam reflected by the surface to be measured is diffracted by the diffraction grating and is caused to enter the reflection/transmission section again, the reflection/transmission section reflects the diffracted first light beam and causes the diffracted first light beam to enter the member at the same specific point on the surface to be measured, again, such that an optical path of the first light beam caused by the reflection/transmission section to enter the member to be measured at the specific point on the surface to be measured of the member to be measured, again and reflected again by the surface to be measured of the member matches with an optical path of the first light beam caused by the reflection/transmission section to enter the member to be measured at the specific point on the surface to be measured of the member to be measured to be thereby reflected by the surface to be measured of the member for the first time.

2. The displacement detecting device according to claim 1, wherein an optical path length of the first light beam from the light-beam splitting section to the light-beam combining section via the diffraction grating, and an optical path length of the second light beam from the light-beam splitting section to the light-beam combining section via the reference reflection section are set substantially equal to each other.

3. The displacement detecting device according to claim 1, wherein a diffraction surface of the diffraction grating is disposed substantially at a right angle with respect to the surface to be measured.

4. The displacement detecting device according to claim 1, further comprising:

a combining-section-side of the reflection/transmission section, which reflects or transmits the first light beam reflected by the member to be measured in accordance with the polarization direction of the first light beam to guide the first light beam to the diffraction grating or the light-beam combining section.

5. The displacement detecting device according to claim 1, wherein there is provided a reflection member that reflects, toward the diffraction grating, the first light beam reflected by the member to be measured.

* * * * *